United States Patent
Tanaka

[19]

[11] Patent Number: 5,936,924
[45] Date of Patent: Aug. 10, 1999

[54] INFORMATION RECORDING AND REPRODUCTION DEVICE

[75] Inventor: Toshihisa Tanaka, Yokohama, Japan

[73] Assignee: Nikon Corporation, Tokyo, Japan

[21] Appl. No.: 08/870,632

[22] Filed: Jun. 6, 1997

[30] Foreign Application Priority Data

Jun. 7, 1996 [JP] Japan ................................ 8-145633

[51] Int. Cl.$^6$ ........................................ G11B 7/00

[52] U.S. Cl. .................................. 369/58; 369/116

[58] Field of Search ........................ 369/44.34, 44.35, 369/58, 54, 717, 116, 124

[56] References Cited

U.S. PATENT DOCUMENTS

| | | |
|---|---|---|
| 4,423,502 | 12/1983 | Dil . |
| 4,858,218 | 8/1989 | Takagi et al. . |
| 5,050,156 | 9/1991 | Barton ........................ 369/116 |
| 5,568,461 | 10/1996 | Nishiuchi et al. ............ 369/116 |
| 5,602,824 | 2/1997 | Ooki et al. . |
| 5,732,061 | 3/1998 | Kirino et al. ................ 369/116 |
| 5,737,289 | 4/1998 | Udagawa ..................... 369/116 |
| 5,745,463 | 4/1998 | Maegawa et al. ............ 369/116 |

FOREIGN PATENT DOCUMENTS

| | | |
|---|---|---|
| 0626679A2 | 11/1994 | European Pat. Off. . |
| A-0-696795 | 2/1996 | European Pat. Off. . |
| 5282705 | 10/1993 | Japan . |

OTHER PUBLICATIONS

Naoyasu Miyagawa et al., Technical Digest—SOM '94—Symposium on Optical Memory 1994—Higher Density Optical Recording Technologies and Their Applications—, Jul. 11–13, 1994.

*Primary Examiner*—Nabil Hindi
*Attorney, Agent, or Firm*—Olieff & Berridge, PLC

[57] ABSTRACT

An information recording and reproduction device records, erases or reproduces information by projecting a laser beam to a recording medium that has a first group of information tracks and a second group of information tracks, both of which are in a concentric or spiral state, there being a difference in a height of the information tracks of the first group relative to the second group, the tracks of the first group alternating with the tracks of the second group in a radial direction of the recording medium. The device includes a recording device that records specific information multiple times at different recording conditions on a selected one of the information tracks; a reproduction device that reproduces the specific information from the selected one of the information tracks; and a controller that determines the recording conditions, erasure conditions, or reproduction conditions to be used for the information tracks of the first group and for the information tracks of the second group based on a plurality of reproduction signals reproduced by the reproduction device. The recording condition can include a wave height value and a pulse width of a recorded pulse. The reproduction conditions can include a reproduction power level and a frequency of the high frequency accumulation. The erasure condition can include an erasure power level.

14 Claims, 14 Drawing Sheets

INFORMATION RECORDING AND REPRODUCTION DEVICE

BACKGROUND OF THE INVENTION

1. Field of the Invention

The present invention relates to an information (i.e., data) recording and reproduction (i.e., retrieval) device, and in particular to an information recording and reproduction device that accomplishes information recording and reproduction relative to both lands and grooves provided on a recording medium.

2. Description of Related Art

In recent years, various techniques have been undertaken in order to improve the recording capacity of magnetooptical recording medium and the like. For example, proposals have been made to use a LAND/GROOVE (L/G) recording and reproduction format in which information is recorded and reproduced relative to both a land (i.e., a protruding part) and a groove (i.e., an indented part) provided in a concentric or spiral shape on the recording medium as an information track (recording region).

With this L/G recording and reproduction format, since the amount of (i.e., the area) of the information track is doubled relative to the recording and reproduction format that accomplishes recording and reproduction relative to only one of the land or groove, the recording capacity can be doubled if the track pitch is kept the same.

When the L/G recording and reproduction format is applied to a magnetooptical recording medium, detection of the specified track position is accomplished, an optical beam of a specified power is illuminated on the land or groove corresponding to the recording and reproduction indication from the position-controlling device (e.g., a host computer), and then recording or reproducing of selected information relative to the information track is performed.

Recording sensitivities can differ between the land track and the groove track of a recording medium using the L/G format. Generally, with this type of recording and reproduction device, the power of the optical beam is changed based on the radial position of the track during recording. However, there is no change made to the recording conditions (e.g., the recording power) based on whether recording is taking place in the land track or in the groove track.

Furthermore, problems occur such that recording cannot be accomplished within appropriate conditions for recording media have recording sensitivities that differ between the land and the groove. Accordingly, there is the problem that recording or erasure may be incomplete. As a result, there are also obstacles to the reproduction operation. Furthermore, because of these factors, through the repetitive execution of recording, erasure, and reproduction operations, the operational speed is reduced, or there is the problem that there is an increase in the ratio of recording and reproduction errors.

SUMMARY OF THE INVENTION

It is an object of the present invention to provide an information recording and reproduction device that can accurately record, erase or reproduce relative to either the land track or the groove track.

In order to achieve this and other objects, an information recording and reproduction device according to embodiments of the invention records, erases or reproduces information by projecting a laser beam to a recording medium that has a first group of information tracks and a second group of information tracks, both of which are in a concentric or spiral state, there being a difference in a height of the information tracks of the first group relative to the second group, the tracks of the first group alternating with the tracks of the second group in a radial direction of the recording medium. The device includes recording means for accomplishing multiple recording of specific information at different recording conditions to a selected one of the information tracks. The device also includes reproduction means for reproducing the specific information from the selected one of the information tracks. The device also includes condition determination means for determining the recording conditions, erasure conditions, or reproduction conditions for the information tracks of the first group and for the information tracks of the second group based on a plurality of reproduction signals reproduced by the reproduction means.

The condition determination means determines the recording conditions, erasure conditions or reproduction conditions for the plurality of information tracks located at different radial positions of the recording medium for the first group, and determines the recording conditions, erasure conditions or reproduction conditions for the information tracks at each of the radial positions for the second group based on the recording conditions, erasure conditions, or reproduction conditions that were determined for the first group.

In addition, the device can also include control means for controlling the recording, erasure or reproduction of information in the selected information track based on conditions determined by the condition determination means.

The control means selects the recording condition, erasure condition, or reproduction condition for the multiple information tracks located at the same radial position and belonging to each of the first and second information track groups, by means of test writing, and on the basis of a proportional coefficient between both information track groups obtained from the selected recording conditions, erasure conditions or reproduction conditions, and calculates recording conditions, erasure conditions or reproduction conditions for the information tracks of the second information track group from the recording conditions, erasure conditions or reproduction conditions determined for the information tracks of the first information track group.

The recording condition can include a wave height value and a pulse width of a recorded pulse.

The reproduction conditions can include a reproduction power level and a frequency of the high frequency accumulation.

The erasure condition can include an erasure power level.

The device also can include a magnetic field control means for controlling a strength of an external magnetic field applied to the recording medium at the time of recording or erasure; the magnetic field control means, by controlling at least one of the strength of the magnetic field, the polarity of the magnetic field, or the period of generation of the magnetic field, applies an external magnetic field that differs corresponding to the recording sensitivity of the recording medium.

BRIEF DESCRIPTION OF THE DRAWINGS

The invention will be described in conjunction with the following drawings in which like reference numerals designate like elements and wherein.

DETAILED DESCRIPTION OF PREFERRED EMBODIMENTS

An explanation relating to an embodiment of the present invention is provided below, with reference to the drawings.

Figure 1:
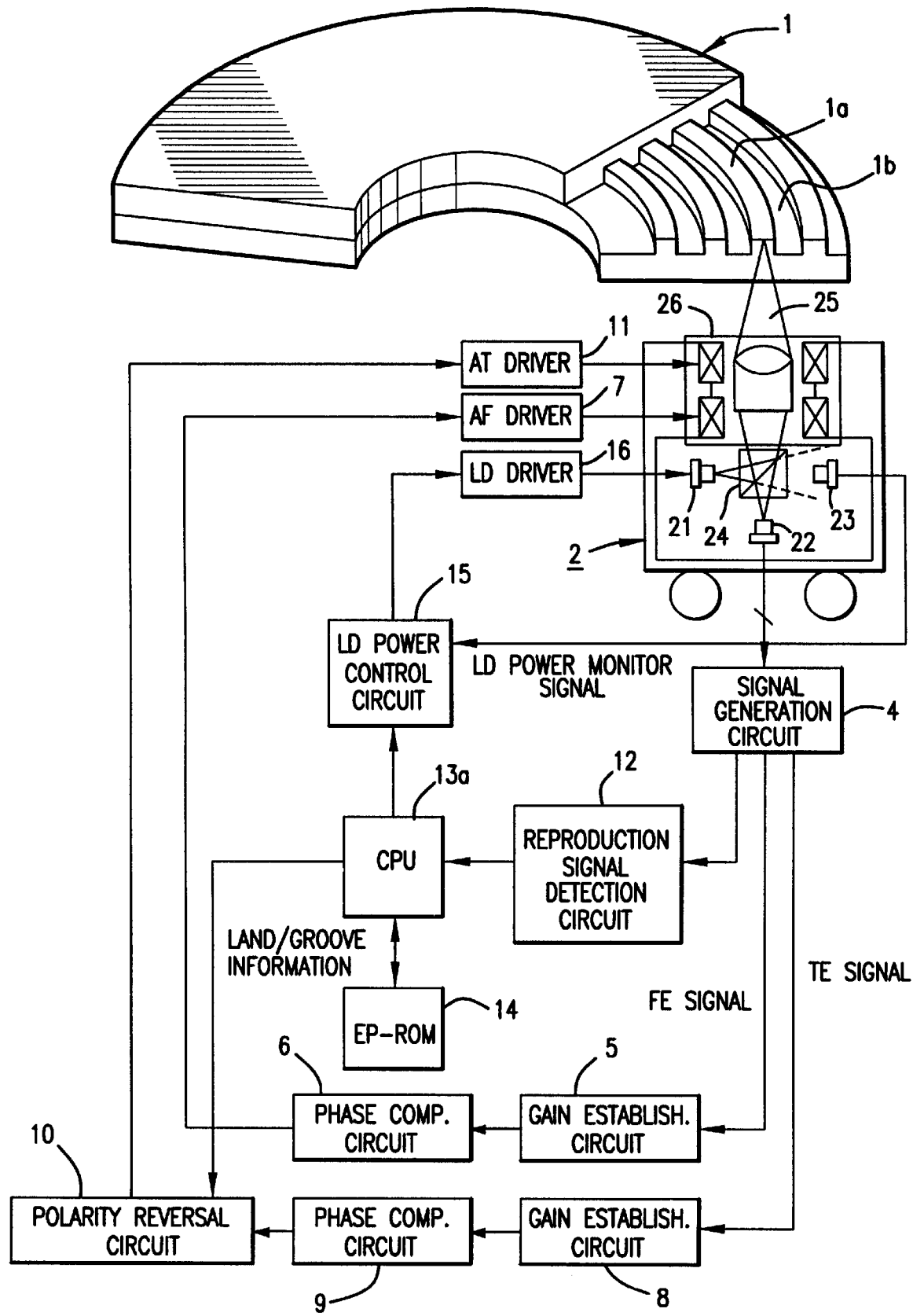
FIG. 1 is a block diagram of an information recording and reproduction device according to a first embodiment of the present invention.

FIG. 1 is a block diagram of an information recording and reproduction device according to a first embodiment of the present invention.

A head 2 is arranged so as to be capable of movement in the direction of the radius of the recording medium 1. The head 2 is provided with a light-producing element (e.g., a semiconductor laser: LD) 21, light receiving elements (e.g., PIN photodiodes) 22 and 23, and an actuator 26.

The LD 21 outputs a light beam (laser light) 25 having a specified power. The light receiving element 22 detects the reflected light from the recording medium 1. The light receiving element (e.g., a PIN photodiode) 23 detects the light output of the light-producing element 21. The actuator 26 controls the radial position and focus relative to the track of the position illuminated by the light beam.

On the recording surface of the recording medium 1 is formed a track groove in a concentric or spiral shape. By means of the track groove, a land component and a groove component are mutually formed in the radial direction. In the present example, in FIG. 1, the upwardly protruding component 1a is called a land (protrusion: a track of a first group), and the indented component 1b is called a groove (indentation: a track of a second group). (In other words, there is a first group of tracks, which are lands, and a second group of tracks, which are grooves.)

The light beam 25 is illuminated onto the recording medium 1 through a spectrometer (polarized beam splitter) 24 from the LD 21 of the head 2, and forms a light spot on the land 1a or on the groove 1b. The reflected light reflected on the land 1a and on the groove 1b of the recording medium 1 is such that the light receiving component receives the light with the light receiving element 22, which is divided into multiple divisions (such as e.g., four divisions), through the spectrometer 24, and the respective light reception signals from each division are output to the signal generation circuit 4.

The signal generation circuit 4 generates a tracking error (TE) signal, which shows positional errors of the light beam 25 relative to the track on the basis of the light beams received, as well as other types of servo signals, such as, e.g., a focus error (FE) signal, which shows focusing errors. Signal generation circuit 4 also generates reproduction signals, which correspond to the information recorded on the track. A focus servo loop is formed of a gain establishment circuit 5, a phase compensation circuit 6, and an AF (auto focus) driver 7. The gain establishment circuit 5 receives the focus error signal, and accomplishes gain adjustment of the focus servo loop and offset adjustment, and outputs an adjusted focus error signal. The phase compensation circuit 6 is a filter circuit that outputs the stability of the control system. It receives the output signal from the gain establishment circuit 5 and performs a filtering process.

The focus servo loop controls the focus of the light beam 25 through the servo control of the actuator 26 by the AF driver 7 on the basis of the focus error signal supplied from the signal generation circuit 4. As a result, the specified focus is obtained with the land 1a and the groove 1b of the recording medium 1.

A tracking servo loop is formed from the gain establishment circuit 8, the phase compensation circuit 9, the polarity reversal circuit 10, and the AT driver 11. The gain establishment circuit 8 and the phase compensation circuit 9 operate the same as the gain establishment circuit 5 and the phase compensation circuit 6 in the focus servo loop. The polarity reversal circuit 10 reverses the polarity of the tracking error signal. The polarity of the tracking error signal when the light beam 25 is illuminated on the land track is the reverse of the polarity of the tracking error signal when the light beam 25 is illuminated on the groove track. The polarity reversal circuit 10 is provided to determine the polarity of the tracking error signal with the land track and the groove track in the same manner.

The tracking servo loop controls slight movement of the illumination position of the light beam 25 in the radial direction by the servo control of the actuator 26 by the AT (auto track) driver 11, on the basis of the tracking illumination signal supplied from the signal generation circuit 4. As a result, the light beam 25 is illuminated on the land 1a or on the groove 1b of the recording medium 1 at a specified position (e.g., in the track center). Through the parallel accomplishment of focus control and tracking control, the light beam 25 can be applied to the specified land 1a or groove 1b.

The reproduction signal detection circuit 12 outputs binary information that indicates the information recorded in the land 1a or groove 1b through the accomplishment of specified signal processing based on the reproduced signal supplied from the signal generation circuit 4. The amplitude information or the integrated information of the generated signal also is output. CPU 13a controls each component on the basis of each type of information supplied from the reproduction signal detection circuit 12 and the EP-ROM 14.

The CPU 13a determines whether the track that is illuminated by the light beam 25 is a land 1a or a groove 1b on the basis of the address information obtained from the binary information. This land/groove information, which shows the determined results, is output to the polarity reversal circuit 10.

The land 1a and groove 1b have sectors and so-called specified unit recording regions, which are provided continuously in the direction of the track. Divided address information that shows the position on the recording medium of the respective tracks also is recorded on each sector.

The CPU 13a is able to confirm whether the track being illuminated by light beam 25 is a land 1a or a groove 1b based on the address information of the sector. For example, the address information of the sector on the land 1a can be odd, and the address information on the sector of the groove 1b can be even. Based on this information, the CPU 13a is able to generate land/groove information.

The CPU 13a outputs an indication signal indicating a change of the polarity, to the polarity reversal circuit 10 based on the land/groove information. The polarity reversal circuit 10 switches the polarity (i.e., the control direction) of the tracking control signal supplied to the AT driver 11 based on the indication signal.

The LD power control circuit 15 controls the LD driver 16 on the basis of commands from CPU 13a, or on the basis of the LD power monitor signal supplied from the light receiving element 23, which detects the output of the light-producing element 21. The light beam 25 having a specified power is output from the light-producing element 21 based on signals supplied from LD driver 16.

In the EP-ROM 14 is pre-stored an appropriate power value for the light beam corresponding to the radial direction position illuminated by the light beam 25. The CPU 13a calculates the radial direction position being illuminated by the light beam 25 on the basis of the address information, reads out the power value of the light beam corresponding to that radial position from the EP-ROM 14, and provides that power value to the LD power control circuit 15.

By this means, the light beam 25 having an appropriate power based on the radial position of the recording medium 1 is output. In addition, the power value at the time of power control is switched to an appropriate respective value corresponding to each operation of recording, erasure and reproduction.

The CPU 13a, in the case when the recording medium 1 is initially mounted, based on a specified radial position of the recording medium 1, controls the accomplishment of a test writing operation to the respective information track of the land 1a and groove 1b. Also, the CPU 13a reproduces the information recorded by test writing, and through the accomplishment of scanning control of the reproduced signals, selects appropriate recording conditions for the recording operation relative to each information track, as well as erasure and reproduction conditions.

Figure 2:
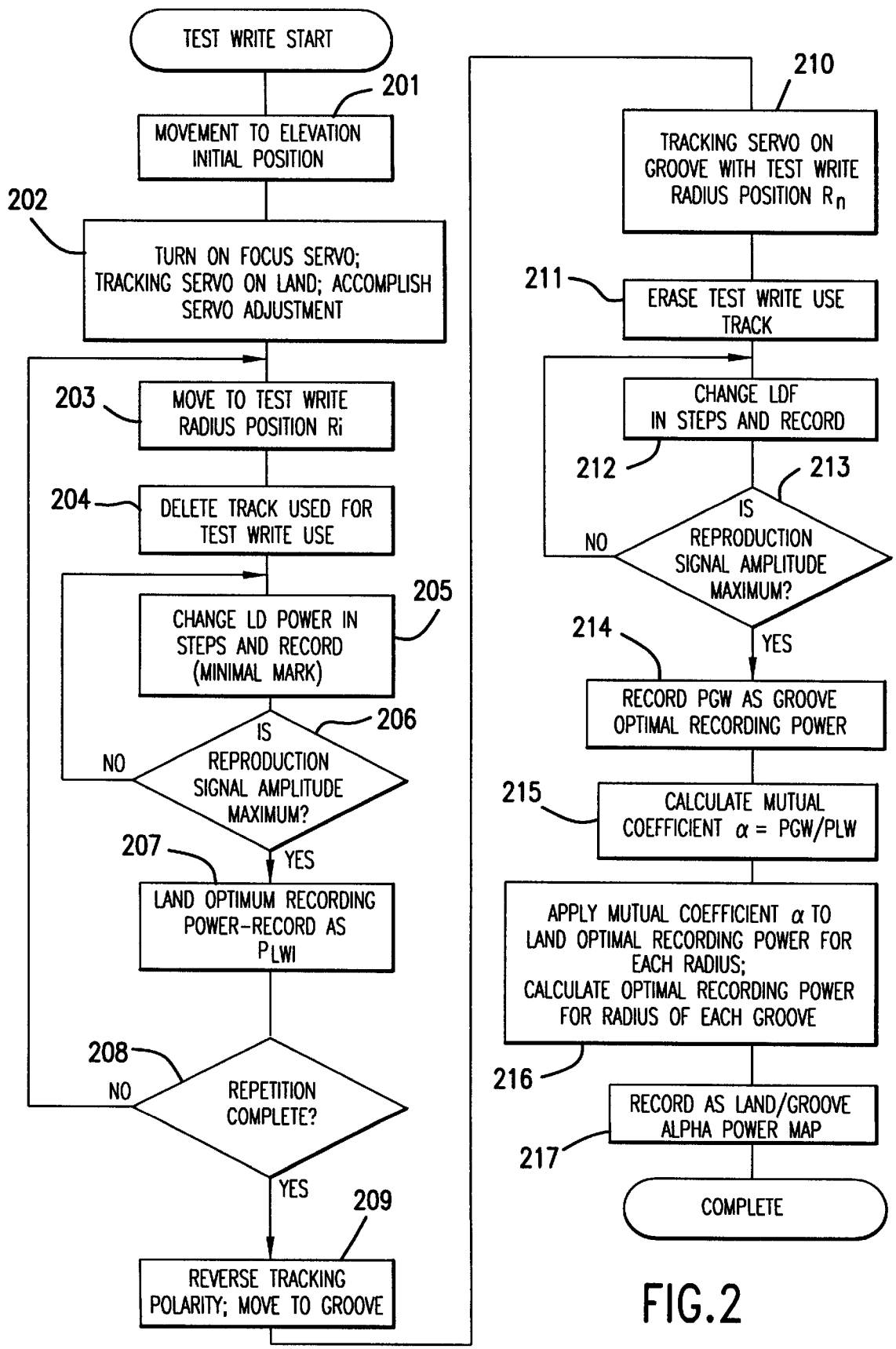
FIG. 2 is a flow chart showing a test writing operation for a non-overwritable recording medium in an information recording and reproduction device according to the first embodiment of the present invention.

Next, an explanation is provided with regard to the operation of an information recording and reproduction device according to the present embodiment with reference to FIG. 2. An explanation is provided of the writing operation with respect to an example of the non-overwritable recording medium.

FIG. 2 is a flow chart showing the test write operation for a non-overwritable recording medium. The non-overwritable recording medium is such that the power of the light beam required for the recording operation is low in comparison to the power required for the erasure operation.

Following the initial mounting of the recording medium 1 (in this instance a non-overwritable recording medium) to the information recording and reproduction device, and after the achievement of a specified number of rotations by the recording medium 1, movement of the head 2 to the initial servo elevation position is accomplished in step 201. A light spot of the light beam 25 is applied to the specified land track, and specified servo adjustment is accomplished in step 202. Servo adjustment can include, for example, adjustment of the gain of the focus servo loop and offset adjustment, or tracking servo loop gain adjustment, or offset adjustment by means of the gain establishment circuits 5 and 8.

Following servo adjustment, the test write operation is accomplished in Steps 203–208 with, for example, the recording medium 1 specified track group, for example, the land track (track of a first group). At this time, test writing is accomplished in at least two or more regions in the radial direction of the medium. In this instance, it is accomplished in radial position R1-Rm regions, where m is the total number of regions.

First, through the accomplishment of the reproduction of the address information (formatted ID data) of sectors pre-recorded in the recording medium 1, following the determination of the current track position, the head 2 is moved in Step 203 by means of a seek control system until it reaches a specified test write region. In this instance, through the parallel accomplishment of the previously described focus control and tracking control, the light beam 25 is applied to a specified land la, and reproduction is accomplished of the address information in the same manner as described earlier, wherein the current track is confirmed as being the land 1a at the radial position R1.

Subsequently, the erasure operation is accomplished in Step 204 relative to the specified track (land 1a). However, if the recording medium 1 is a type of medium of an added shape (write once), the erasure operation is unnecessary.

Figure 4:
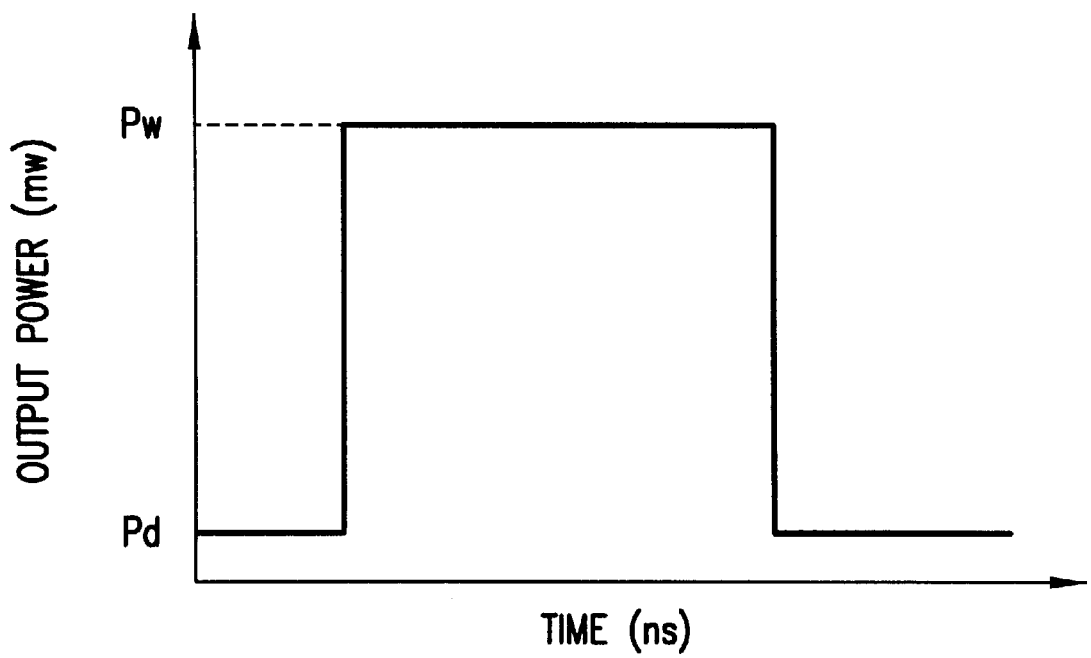
FIG. 4 shows an example of the waveform of the recording power of the light beam used in an embodiment of the present invention.
Figure 8:
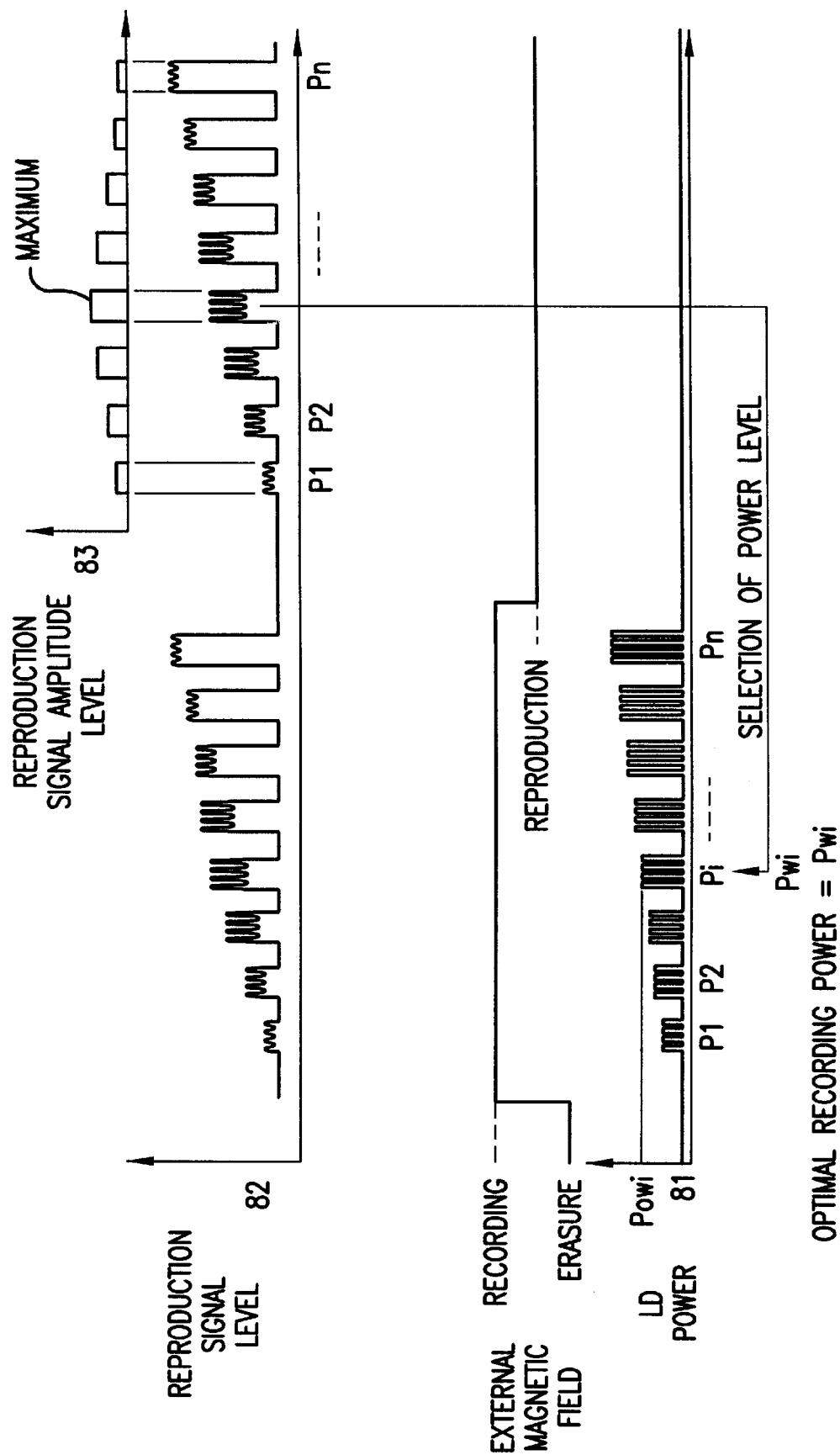
FIG. 8 is a sequence diagram showing the operation that obtains the optimal recording power of a non-overwritable recording medium according to the first embodiment of the present invention.

Next, as shown in FIG. 8, the recording power 81 of the light beam 25 is switched in steps to P1-Pn, and minimal marks are continuously written in Step 205. The recording power waveform is basically the short pulse shape shown in FIG. 4, however, it may also accomplish analog correction to emphasize the rising characteristics (not shown in the diagram).

In the case when reproduction is accomplished of the written-in marks, changing the recording power, as shown in FIG. 8, causes the reproduction signal level 82 and the reproduction signal amplitude level 83 to change.

Figure 6:
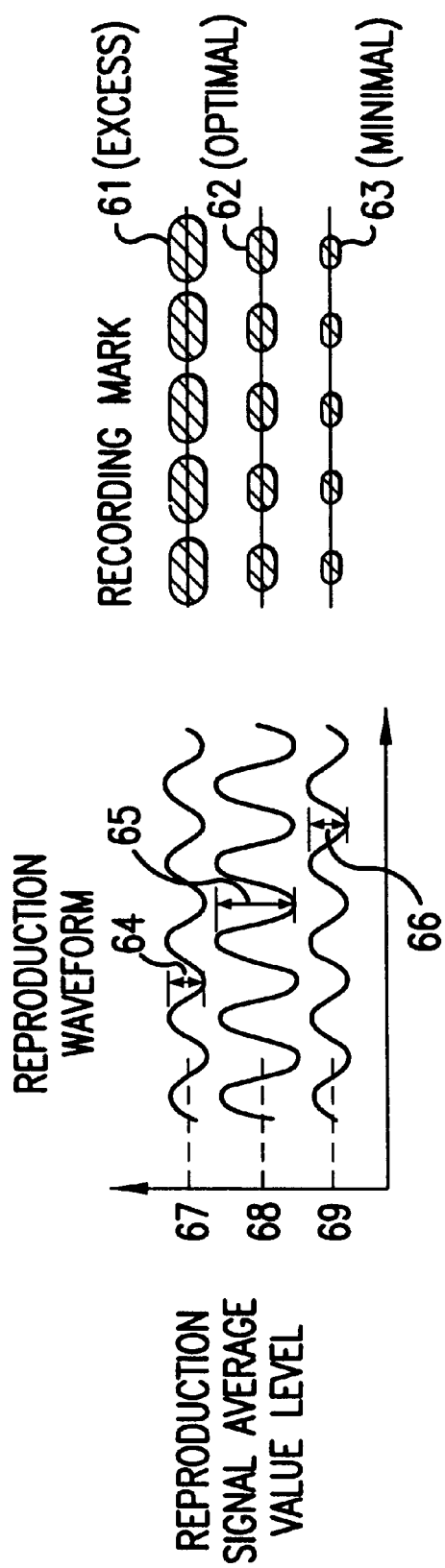
FIG. 6 is a diagram showing the relationship between the recording power and the reproduction signal of the light beam according to an embodiment of the present invention.

As shown in FIG. 6, generally, when the optimal recorded marks 62 are the standard, they have a signal amplitude 65 and average value 68. The retrieved signal amplitude 64 of the mark 61 recorded with excessive power is smaller than the standard, and the average value level 67 increases. In addition, the retrieved signal amplitude 66 of the mark 63 recorded with a small amount of power becomes smaller, and the average value level 69 also becomes smaller.

The amplitude of the retrieved signal is monitored, and as is shown in FIG. 8, the power recorded at the time that the retrieved signal amplitude 83 is maximized becomes the optimal recording power in Step 206. The optimal recording power is recorded in Step 207 to EP-ROM 14 as the optimal recording power of the land track with the radial position R1.

Furthermore, observation may also be accomplished of the amplitude of the reproduced signal, reproduction being accomplished following each test writing. Following the continuous writing, switching the recording power, cumulative reproduction is accomplished, and detection is also made of when the amplitude of the reproduced signal becomes maximized.

In this manner, the optimal power of the land track of each radial position R1-Rm is obtained through the repetitive execution of test writing from Steps 203 to 207, relating to the radial position R1-Rm (repetition being accomplished via Step 208).

Next, the land/information toward the polarity reversing circuit 10 is changed to that of a groove, and the tracking error signal polarity is reversed. Also, the illumination position of the light beam 25 is moved toward the groove track in Steps 209 and 210, thereafter obtaining the optimal recording power for the groove track.

The position of the groove track that accomplishes the test writing selects only one position of either of the radial positions R1-Rm. If selection is accomplished of the final test write radial position Rm of the land track as the radial position, then movement control of the head 2 can be curtailed, and the processing time can be shortened.

In this instance, only with the radial position Rm is the recording power changed in steps, and recorded. Detection of when the amplitude of the reproduced signal reaches the maximum is accomplished in the same manner as with the land track. The recording power at this time is recorded as the optimal recording power of the groove track at radius Rm in Steps 211–214.

Next, using the optimal recording power of a land and of a groove having the same diameter Rm, a proportional coefficient a of the power of the land track and of the groove track, represented as PLW and PGW respectively, is calculated by means of the following formula:

$$a = PGW/PLW$$

Utilizing this coefficient, the optimal recording power following the entire radius of the groove track can be determined in Step 216 that show.

Initially, the map of the optimal recording power following each continuous radius is created through the accomplishment of interpolation based upon information obtained by the test writing process from the land track. Next, applying the proportional coefficient to each value with the appropriate recording power map of the land track, the appropriate recording power map of the groove track is obtained.

The power map of the land and the groove track for each radius obtained in this manner is recorded in the EP-ROM 14 in Step 217. Control is accomplished of the actual recording power in subsequent operations on the basis of this map.

Figure 3A:
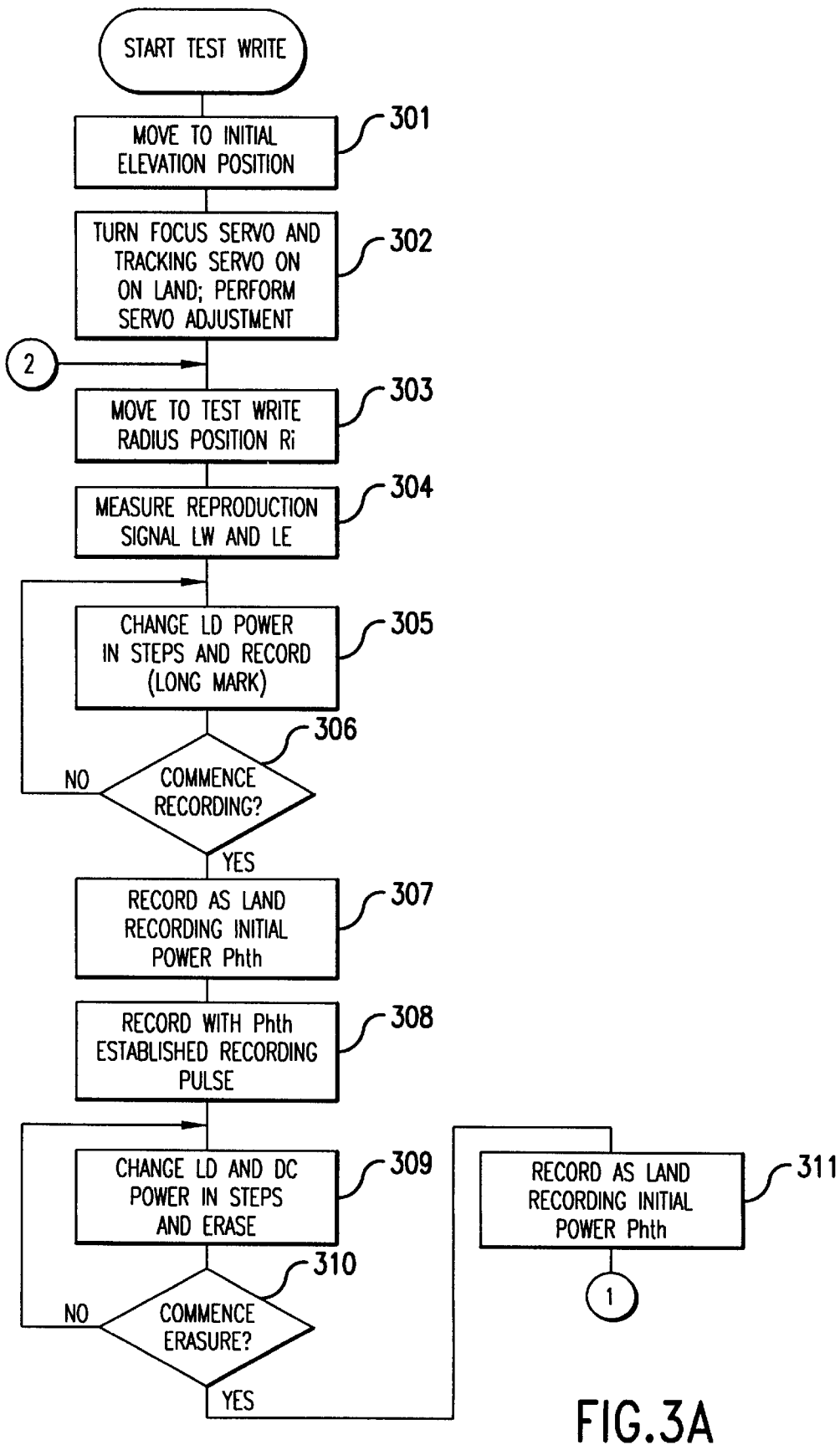
FIG. 3 is a flow chart showing a test writing operation relative to an overwritable recording medium in an information recording and reproduction device according to the first embodiment of the present invention.
Figure 3B:
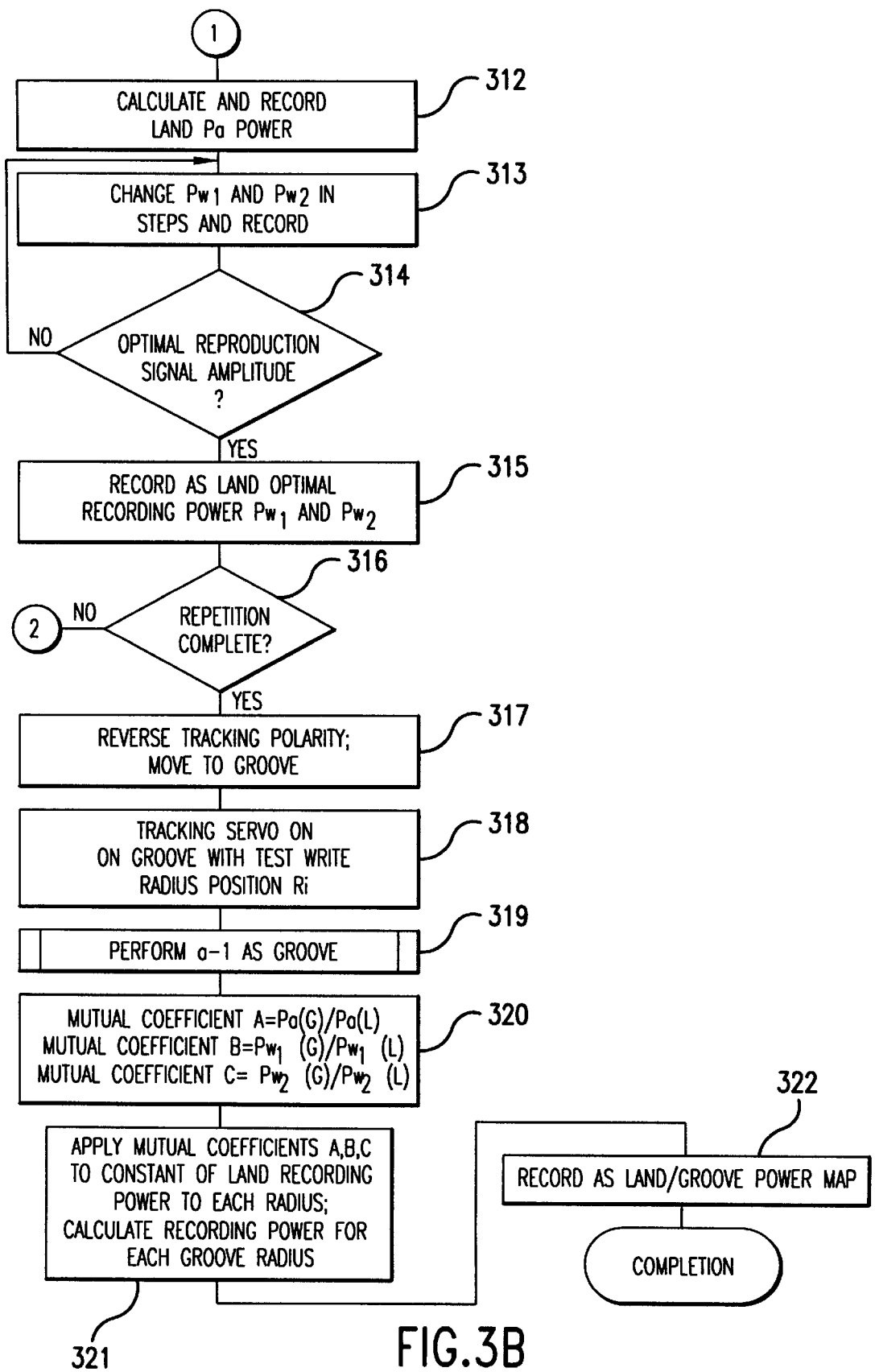

Next, an explanation is provided with respect to the test writing operation accomplished when an overwritable medium is initially mounted as the recording medium 1, with reference to FIG. 3.

FIG. 3 is a flow chart showing the test writing operation relative to the overwritable recording medium. The overwritable recording medium is shown to be a high recording medium, relative to the power of the erasure operation for the power of the light beam necessary to perform the recording operation, such as for example, a magnetooptical recording medium or a relative change type recording medium.

The recording medium 1 (in this instance the overwritable recording medium) is mounted in the information reproduction device. Following the achievement of a specified number of rotations by the recording medium 1, the head 2 moves in Step 301 to the initial elevation by means of a specified seek control system (not shown in the diagram). Next, the light spot of the light beam 25 is applied to the specified land track, and specified servo adjustment is accomplished in Step 302. The servo adjustment operation is the same as in the case when test writing is accomplished on the non-overwritable recording medium.

Following servo adjustment, for the specified track loop of the recording medium 1, for example, the land track (track of the first group), the test writing operation is accomplished in Steps 303–316. At this time, the test writing is accomplished in at least two or more regions in the radial direction of the medium. In this instance, it is accomplished in the radial position R1-Rm regions, where m is the total number of regions.

First, through the accomplishment of the reproduction of the address information (the formatted ID information) of the sector pre-recorded in the recording medium 1, and following the determination of the current track position, the head 2 is moved in Step 303 by means of a seek control system to the specified test writing region. Through the parallel accomplishment of focus control and tracking control, a light beam 25 is applied to the specified land 1a, and as described earlier, the address information is reproduced, and confirmation is accomplished that the current track is the land 1a at the radial position R1.

Subsequently, the DC (direct current) recording and DC (direct current) erasure operation is accomplished relative to the land 1a, and the retrieved signal maximum value (recording state) Lw and minimum value (erasure state) Le is obtained in Step 304.

Figure 5:
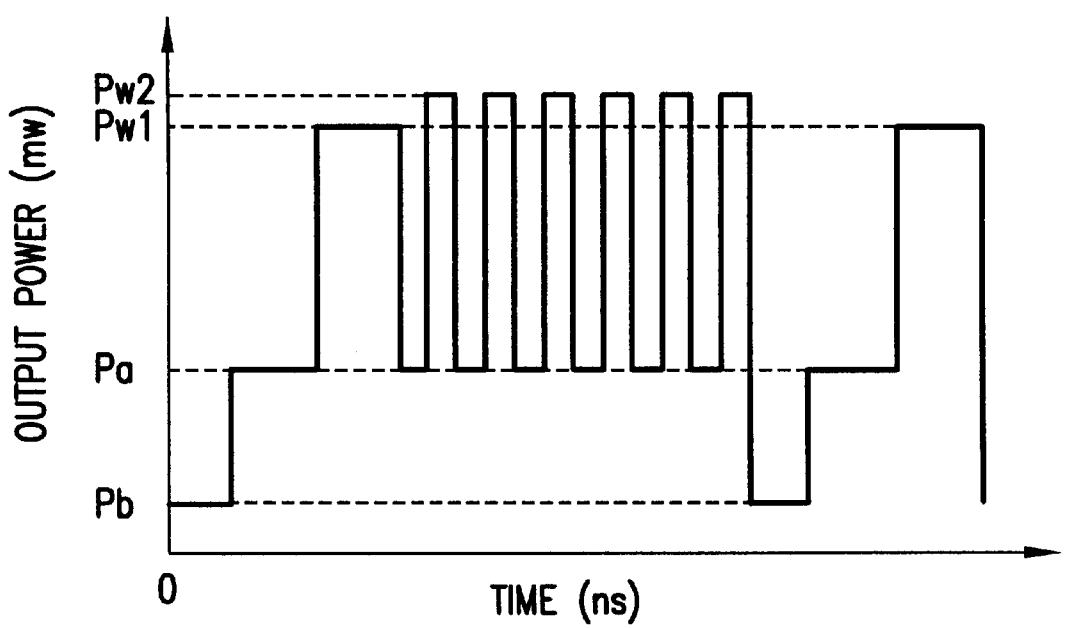
FIG. 5 is a diagram showing another waveform of the recording power of the light beam according to an embodiment of the present invention.
Figure 9:
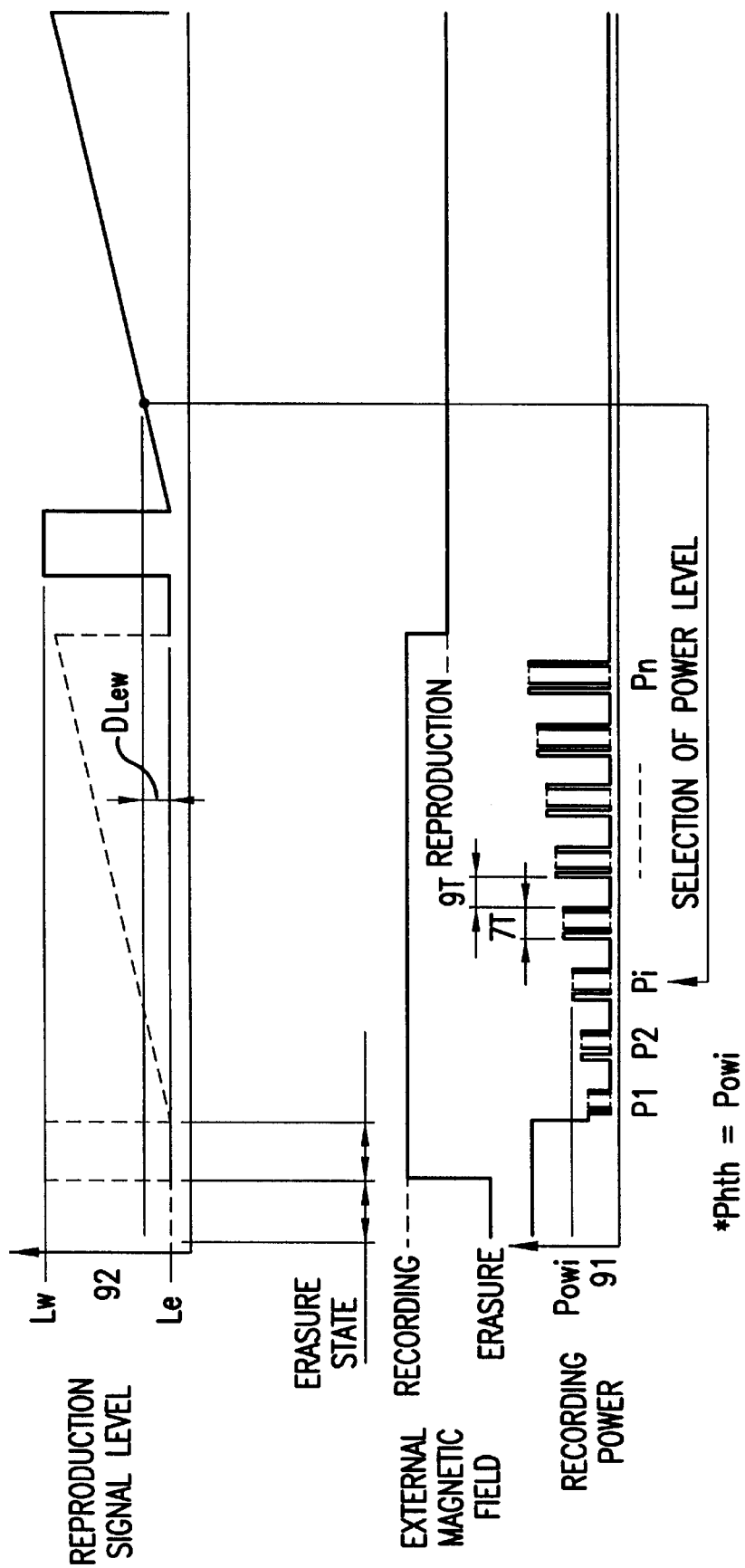
FIG. 9 is a sequence diagram showing the operation for obtaining the optimal recording power of the overwritable recording medium according to the first embodiment of the present invention.

Next, as shown in FIG. 9, the recording power 91 of light beam 25 is switched in steps to P1-Pn, and the long mark is continuously recorded, and written-in in Step 305. The recording power waveform becomes the pulse train shown in FIG. 5.

Thus, in the case when reproduction is accomplished of the long written-in mark, subsequent changing of the recording power 91, as shown in FIG. 9, the DC (direct current) components of the reproduction signal level 92 change. When these changes exceed 10% (Dlew) of the width of Lw-Le, the recording power 91 is recorded in Steps 306 and 307 to EP-ROM 14 as Phth.

Figure 10:
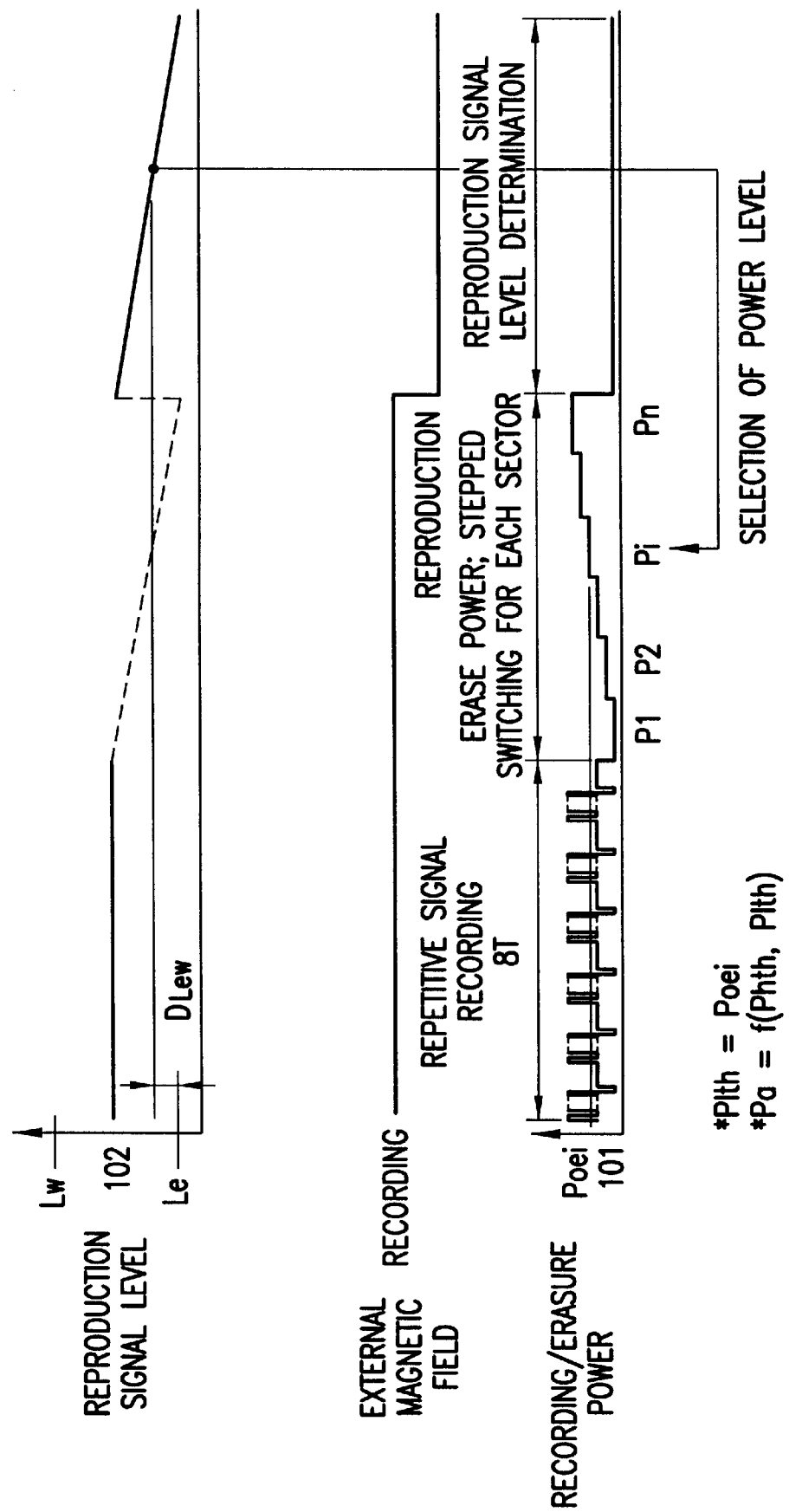
FIG. 10 is a sequence diagram showing the operation for obtaining the optimal erasure power of an overwritable recording medium according to the first embodiment of the present invention.

Next, as shown in FIG. 10, utilizing the recording power Phth, following the recording in Step 308 of the long mark by means of the established recording pulse, the erasure power 101 is switched in steps, accomplishing the erasure in Step 309. In the case where the retrieved signal level 102 following erasure drops below 10% of the width Lw-Le (DLew), then the erasure power 101 is recorded in Steps 310 and 311 to EP-ROM 14 as Plth. Using the obtained Phth and the Plth, calculation is accomplished in Step 312 of the erasure power Pa of the land track.

Next, utilizing the obtained erasure power Pa, repetitive recording is accomplished of the minimum mark while changing the power Pw1 in steps. Detection is accomplished of the average value level of the minimum mark repetitive reproduced value, its level selecting the recording power Pw1, which becomes the center of the width of Lw-Le.

Figure 7:
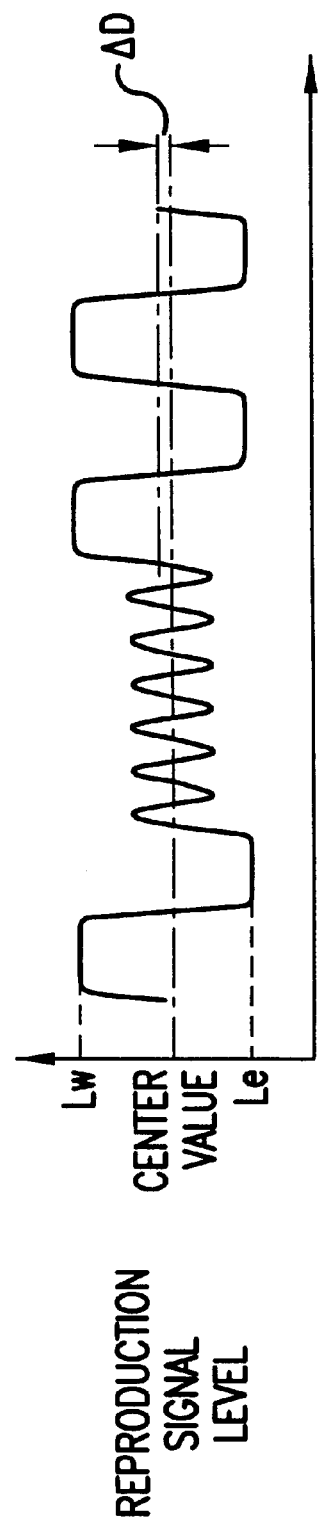
FIG. 7 is a diagram showing the relationship between the optimal recording power and the reproduction signal level according to an embodiment of the present invention.

Utilizing Pa and Pw1, the long mark is repetitively recorded, and as shown in FIG. 7, the average value level of the long mark repetitive reproduction signal selects in Steps 313 and 314 the recording power Pw2, which becomes the center value of the width of Lw-Le.

By this means, Phth, Plth, Pa, Pw1, Pw2, which comprise the optimal recording levels of the land track with the radius R1 and the parameters of the erasure power are obtained, and recorded to the EP-ROM 14 in Step 315.

Thus, by repetitively executing (via Step 316) the test write process from Steps 303–315 relating to the radius positions R1-Rm, the optimal recording of the land track of each radial position R1-Rm and the erasure power is obtained.

Next, by changing the land/groove information toward the polarity reversal circuit 10 to a groove the polarity of the tracking is reversed, and moved toward the groove track, as an applied state in Steps 317 and 318, thereafter obtaining the optimal recording power and the erasure power for the groove track. The test writing for the groove track is accomplished by selecting only one point of either of the radial positions R1-Rm. Furthermore, through the selection of the optimal write radius Rm of the land track as the radial position, the movement control of the head 2 can be curtailed, and it becomes possible to shorten the processing time.

In this instance, execution (of test writing) is accomplished of the described Steps 304–315 only with the radius Rm, and the Phth, Plth, Pa, Pw1, and Pw2, which comprise the optimal recording of the groove track with the radius Rm, and the parameters of the erasure power are recorded in Step 319 to EP-ROM 14.

Next, utilizing the (L), which shows the land track and (G) which shows the groove track, calculation is accomplished of the proportional coefficient of the land and the groove track, by means of the following formulae:

$A=Pa(G)/Pa(L)$ $B=Pw1(G)/Pw1(L)$ $C=Pw2(G)/Pw2(L)$

If these coefficients are utilized, then creation can be accomplished in Step 321 of a map that shows the optimal recording and erasure powers for each radius of the groove track.

First of all, the map of the optimal recording power for each continuous radius is created through the accomplishment of interpolation based upon the information obtained through the test writing of the land track. Next, creation is accomplished of the map of the optimal recording and erasure power of the groove track by applying the proportional coefficient to the map of the optimal recording and erasure powers of the land track.

The land and the groove track power map for each radius thus obtained are recorded in Step 322 in EP-ROM 14, and control is accomplished of the actual recording and erasure power in subsequent operations, on the basis of this map.

With such an execution, in the specific radius position of the recording medium 1, the test write operation is accomplished for each information track of the land and groove, and through the detection of its reproduction signal, the optimal conditions are obtained for the recording of information, erasure and reproduction operations relative to each information track. Furthermore, accurate recording and reproduction can be accomplished even relative to either the land or groove which has different recording sensitivities, through the comparison of the accomplishment of a recording operation with a light beam of the same power also relative to the information track of either the land or groove.

In addition, calculation is accomplished of conditions relative to the information track of a selected position, on the basis of recording, erasure, and reproduction conditions relative to multiple information tracks for different radial positions. Alternatively, calculation is accomplished of conditions relative to the information track belonging to another track group from one track group on the basis of the proportional coefficient of both obtained from the recording, erasure and reproduction conditions relative to the respective information tracks of the same radial position belonging to the land or groove. Furthermore, curtailment can be accomplished of the test writing relative to each information track, and the processing time required for the creation of the optimal recording power map can be greatly reduced.

Furthermore, in the above explanation, even with a land/groove test write operation relative to the recording medium of either non-overwritable or overwritable type, either of the standards of the land or the groove would be acceptable.

In addition, without considering the interrelationship between land and groove, the sequence with the land track can be applied in its existent state to the groove track.

In addition, with the land and each information track of the groove, which has differing sensitivities, an explanation has been provided of a case in which the optimal recording of the light beam, and the reproduction power were obtained as recording conditions, however, this invention is not limited to this example. For example, it would also be acceptable to obtain the optimal pulse width of the light beam in lieu of the power, as the recording condition. In addition, the optimal reproduction power or the high frequency accumulation of the reproduction time can be test written relative to the land track and groove track, and it would also be acceptable to make a determination independently, or using a mutual relationship.

In addition, it would also be acceptable to record the mutual information comprising the recording of the land track and groove track, reproduction, and erasure conditions to the recording medium in advance. Also, following the accomplishment of the test writing operation relative to any one of the tracks, establishment may also be made of the recording of both tracks, reproduction, and erasure conditions, utilizing the information that has been prerecorded on the medium.

In addition, accomplishing the test writing operation within the adjustment process of the recording and reproduction device, a part or all of each recording, reproduction, and erasure condition, as well as the mutual relationship conditions relative to the average medium characteristics of the land track and groove track may be written to the one time ROM in advance.

The information recording and reproduction device according to the first embodiment accomplishes the recording of information by means of a so-called "light modulating format." However, an explanation is provided hereafter with regard to a recording device for recording information with a "magnetic field modulation format" as the second embodiment.

Figure 11:
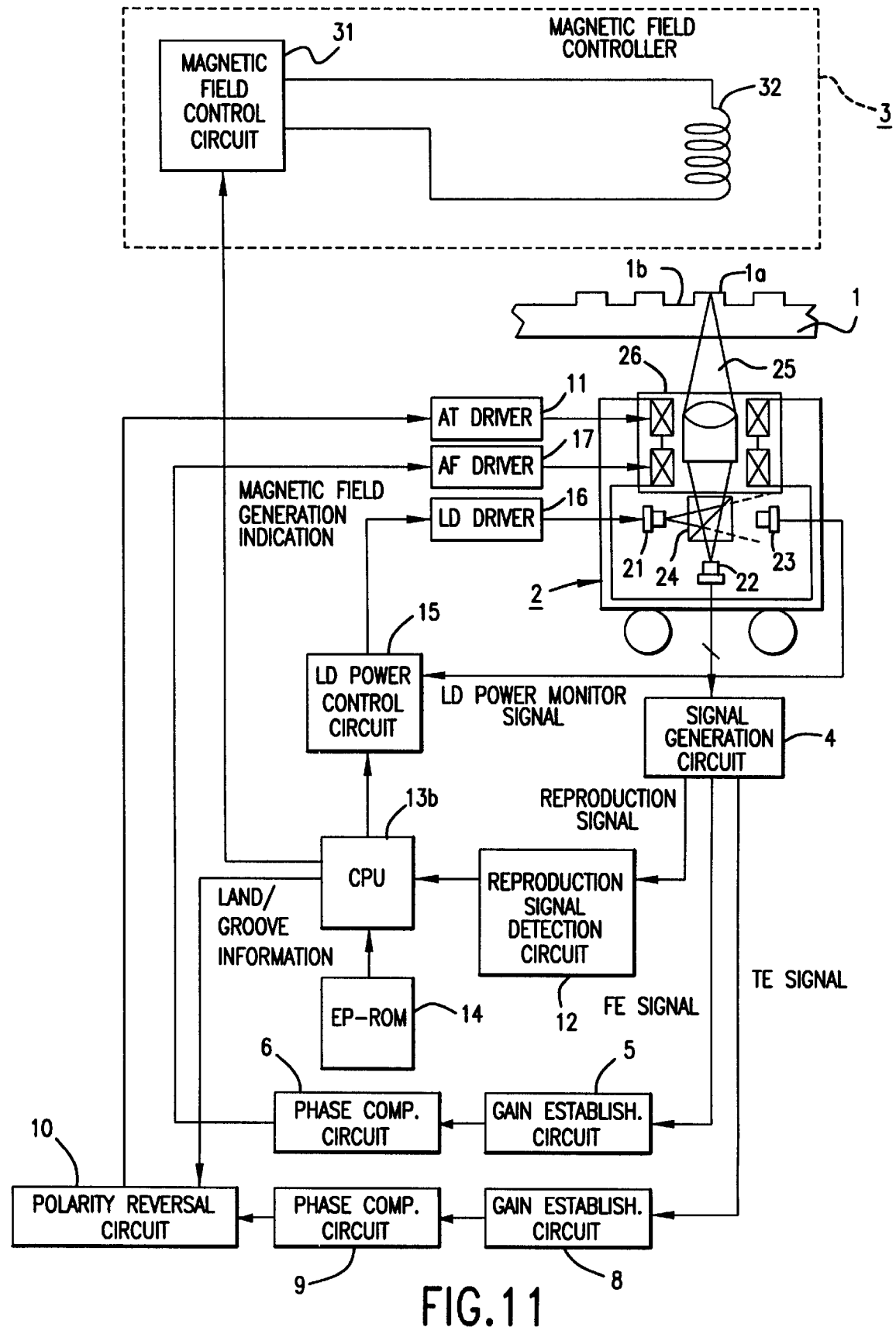
FIG. 11 is a block diagram of an information recording device according to a second embodiment of the present invention.

FIG. 11 is a block diagram of the information recording device according to a second embodiment of the present invention. Labels in FIG. 11 having the same numbers as those in FIG. 1 have the same function as those in FIG. 1.

The CPU 13b controls each component on the basis of each type of information obtained from the reproduction signal detection circuit 12 and from the EPROM 14. The CPU 13b further determines whether the track position illuminated by the light beam 25 is a land 1a or a groove 1b, on the basis of address information obtained from binary information, and outputs the land/groove information, which show the determination results, to the polarity reversal circuit 10.

With the polarity determination circuit 10, the polarity (control direction) of the track servo loop toward the AT driver 11 is switched corresponding to the land/groove information.

The LD power control circuit 15 controls the LD driver 16 on the basis of the LD power monitor signal from the light receiving element 23, which detects the output of the indication from the CPU 13b and from the light-producing element 21. From this process, the specified power light beam 25 is output from the light-producing element 21.

The CPU 13b calculates the radius position illuminated by the light beam 25 on the basis of the address information, and, in accordance with the radius position, the power value of the light beam 25 which is pre-stored in the EP-ROM 14 is read out, and indicated to the LD power control circuit 15.

Thus, an appropriate power light beam 25 is output corresponding to the radius position of the recording medium 1. In addition, the power control is switched to a respectively appropriate value even in accordance with the recording/erasure/reproduction operation.

The magnetic field control device 3 controls the strength of the external magnetic field applied relative to the recording medium 1 at the time of the recording/erasure operation. The magnetic control device 3 is provided with a magnetic control circuit 31 and a coil 32. The magnetic field control circuit 31 outputs the specified drive current corresponding to the magnetic field generation indicator which includes the land/groove information from the CPU 13. The coil 32 generates a specified external magnetic field corresponding to the drive current.

Figure 13:
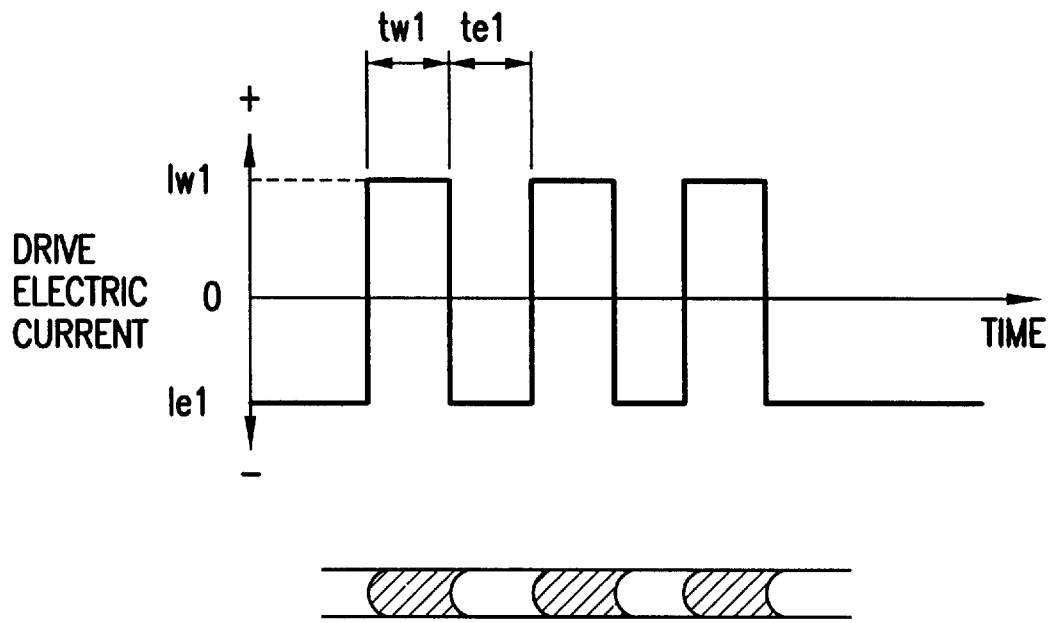
FIG. 13 is a signal waveform diagram showing the drive electric current at the time of the recording/erasure operation relative to the land according to the second embodiment of the present invention.
Figure 14:
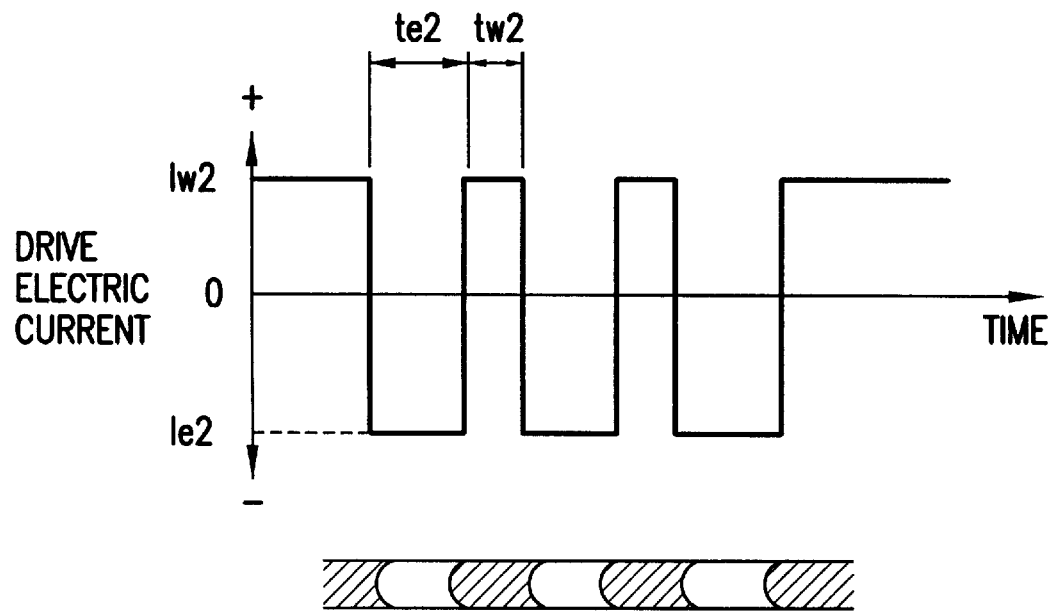
FIG. 14 is a signal waveform diagram showing the drive electric current at the time of recording/erasure relative to the groove according to the second embodiment of the present invention.

Next, an explanation is provided of an example of a case in which recording is accomplished of information in the land and groove from the mounted recording medium, relating to the operation of the present embodiment, and with reference to FIGS. 13 and 14. FIG. 13 is a signal waveform diagram that shows the drive current at the time of the recording or erasure operation relative to the land. FIG. 14 is a signal waveform diagram which shows the drive current at the time of recording or erasure operation relative to the groove.

After the recording medium 1 is mounted in the information recording device, and after the recording medium 1 makes a specified number of rotations, then the head 2 moves to the initial servo elevated position by means of a specified seek control system (not shown in the diagram). Next, the light spot of the light beam 25 is applied to the specified land track, and specified servo adjustment is accomplished.

By means of the servo adjustment, for example, the gain adjustment of the focus servo loop, offset adjustment, gain adjustment of the tracking servo loop, and offset adjustment is accomplished by gain establishment circuits 5 and 8.

Following servo adjustment, and the determination of the current tracking position through the accomplishment of the reproduction of the address information (formatted ID data) of the sector prerecorded in the recording medium 1, the head 2 is moved to the intended recording region by means of a seek control system.

Furthermore, the light beam 25 is added to a specified track (land 1a) through the parallel accomplishment of focus control and tracking control. Also, detection is accomplished of when the current track is a land 1a, reproducing the address information in the same manner as has been described, and the corresponding land and groove information is generated.

Subsequently, the recording/erasure operation is accomplished relative to the specified track (land 1a).

First, the CPU 13b reads out the power at the time of recording corresponding to the radius position, from the EP-ROM 14, and indicates it to the LD power control circuit 15. Correspondingly, the specified track (land 1a) of the recording medium 1 is illuminated by the specified power light beam 25 from the light-producing element 21.

In parallel with this, the CPU 13b indicates the recording operation to the land 1a by outputting a magnetic field generating indication which includes the land/groove information relative to the magnetic field control circuit 31. Correspondingly, the pattern drive current from the magnetic control circuit 31, such as that shown in FIG. 13, is output to coil 32. Also, the specified external magnetic field is applied relative to the specified track (land 1a) of the recording medium 1.

As the establishment of the drive current value, respective establishment is accomplished of the peak values Iw1 and Ie1 of the drive electric current at the time of recording and erasure, the pulse width tw1 and te1, and the polarity (positive or negative) corresponding to the recording sensitivity of the land 1a.

In FIG. 13, a pattern, wherein the drive electric current pulse of the positive polarity which has a peak value Iw1 and a pulse width tw1 at the time of mark recording to the land, is supplied to the coil 32, and the drive electric current pulse of the negative polarity which has a peak value Ie1 and a pulse width te1 at the time of mark erasure is supplied to the coil 32.

On the other hand, at the time of accomplishing recording or erasure operation relative to the specified track (groove 1b), as described, the CPU 13b reads out the power at the time of recording corresponding to the radius position from the EP-ROM 14, and indicates it to the LD power control circuit 15. Corresponding to this, a light beam 25 of specified power is illuminated from the light-producing element 21, relative to the specified track (groove 1b) of the recording medium 1.

In parallel with this, the CPU 13b indicates the recording operation to the groove 1b, through the output of a magnetic field generation indication which includes a land/groove information relative to the magnetic control circuit 31. Corresponding to this, the drive electric current of the pattern such as that shown from the magnetic field control circuit 31 in FIG. 14 is output to coil 32, and the specified external magnetic field is applied relative to the specified track (groove 1b) of the recording medium 1.

As the establishment of the drive electric current value, respective establishment is accomplished of the peak values Iw2 and Ie2 of the drive electric current at the time of recording and erasure, the pulse width tw2 and te2, and the polarity (positive or negative) corresponding to the recording sensitivity of the groove 1b.

FIG. 14 shows a pattern where the drive electric current pulse of a positive polarity which has a peak value of Iw2 and a pulse width tw2 at the time of mark recording to the land, is supplied to coil 32, and a drive electric current pulse of a negative polarity which has a peak value Ie2, and pulse width te2 at the time of mark erasure, is supplied to coil 32.

With the magnetic control circuit 31, selection is made of one of the drive electric current pulses shown in either FIG. 13 or FIG. 14, on the basis of the land/groove information included in the magnetic field generating indicator from the CPU 13b. The drive electric current shown in FIG. 13 and the drive electric current shown in FIG. 14 are provided with respective current peak values (magnetic strength), pulse widths, and different points of polarity. Depending upon the recording sensitivity of the land 1a and the groove 1b, it would be acceptable if all of these parameters were to differ, and it would also be acceptable if each parameter differed independently, or in combination. In addition, the rise characteristics caused by the analog correction of the short shaped pulse may also output an emphasized pulse.

In this manner, according to the present embodiment, a magnetic control device 3 is attached that applies a different external magnetic field (magnetic field condition) corresponding to the recording sensitivity, and relative to the land 1a and the groove 1b of the recording medium 1. Also, application is accomplished of respective external magnetic fields corresponding to whether the track which comprises the subject of the recording/erasure operation is land la, or groove 1b. Owing to this, an improvement is made compared with the case in which accomplishment is made of recording/erasure under fixed magnetic field conditions, such as with the conventional art, and therefore accurate recording/erasure can be accomplished relative to either the land/groove, for which the recording sensitivity differs.

Figure 12A:
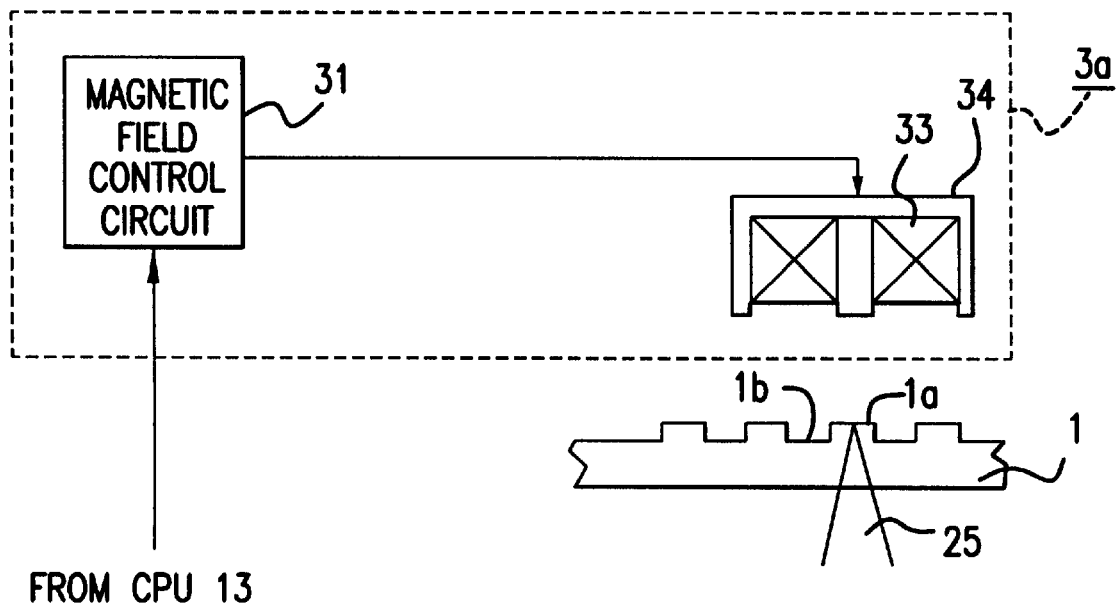
FIG. 12 is a diagram showing an example of the construction of a magnetic field control device of the information recording and reproduction device according to the second embodiment of the present invention.

In addition, with the present embodiment, the magnetic control device 3 is formed so as to apply a specified external magnetic field corresponding to the recording sensitivity of the land 1a and the groove 1b by supplying a specified drive current to the coil 32 from the magnetic control circuit 31, however, the present invention is not limited to this. For example, in the case where switch control is accomplished over the magnetic field strength and polarity at the time of recording to the land 1a or the groove 1b, construction may also be comprised of the coil 33 and the strong magnetic body 34, such as the magnetic control device 3a shown in FIG. 12A.

Figure 12B:
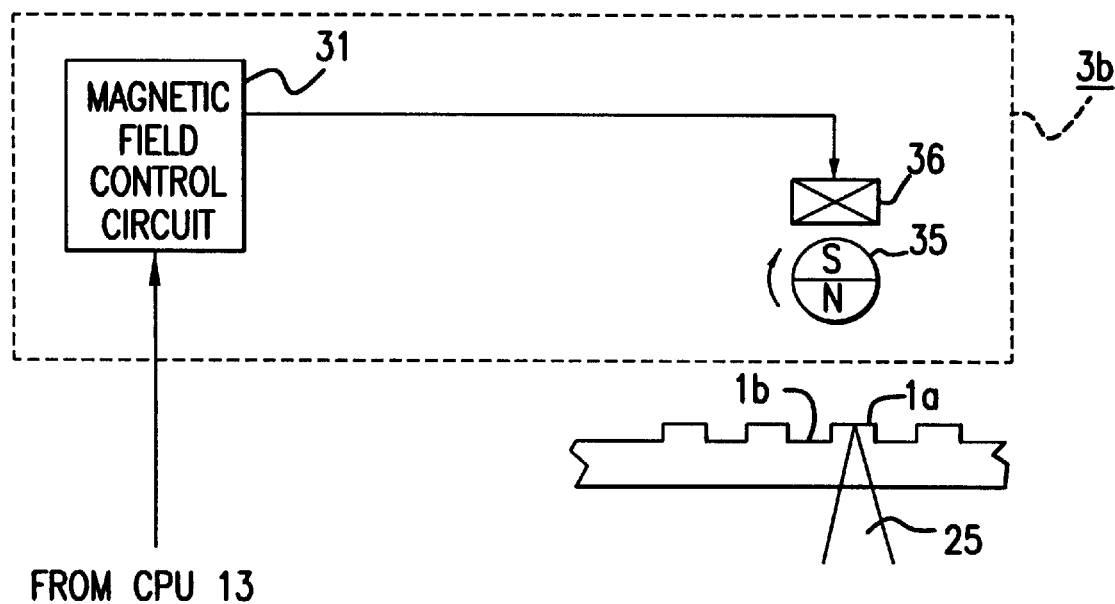

In addition, in the case where switch control is accomplished only over the polarity at the time of recording to the land 1a and the groove 1b, construction may be also accomplished of a coil 36 and a permanent magnet 35 indicated to be self-rotating, such as with the magnetic field control device 3b shown in FIG. 12B. In this case, the coil 36 is excited by the polar characteristics of either the S pole, or the N pole, corresponding to the polarity of the drive electric current supplied from the magnetic field control circuit 31, and the permanent magnet 35 corresponding to these rotates, and the external magnetic field which has a specific polarity is applied to the corresponding land la and groove 1b.

Figure 15:
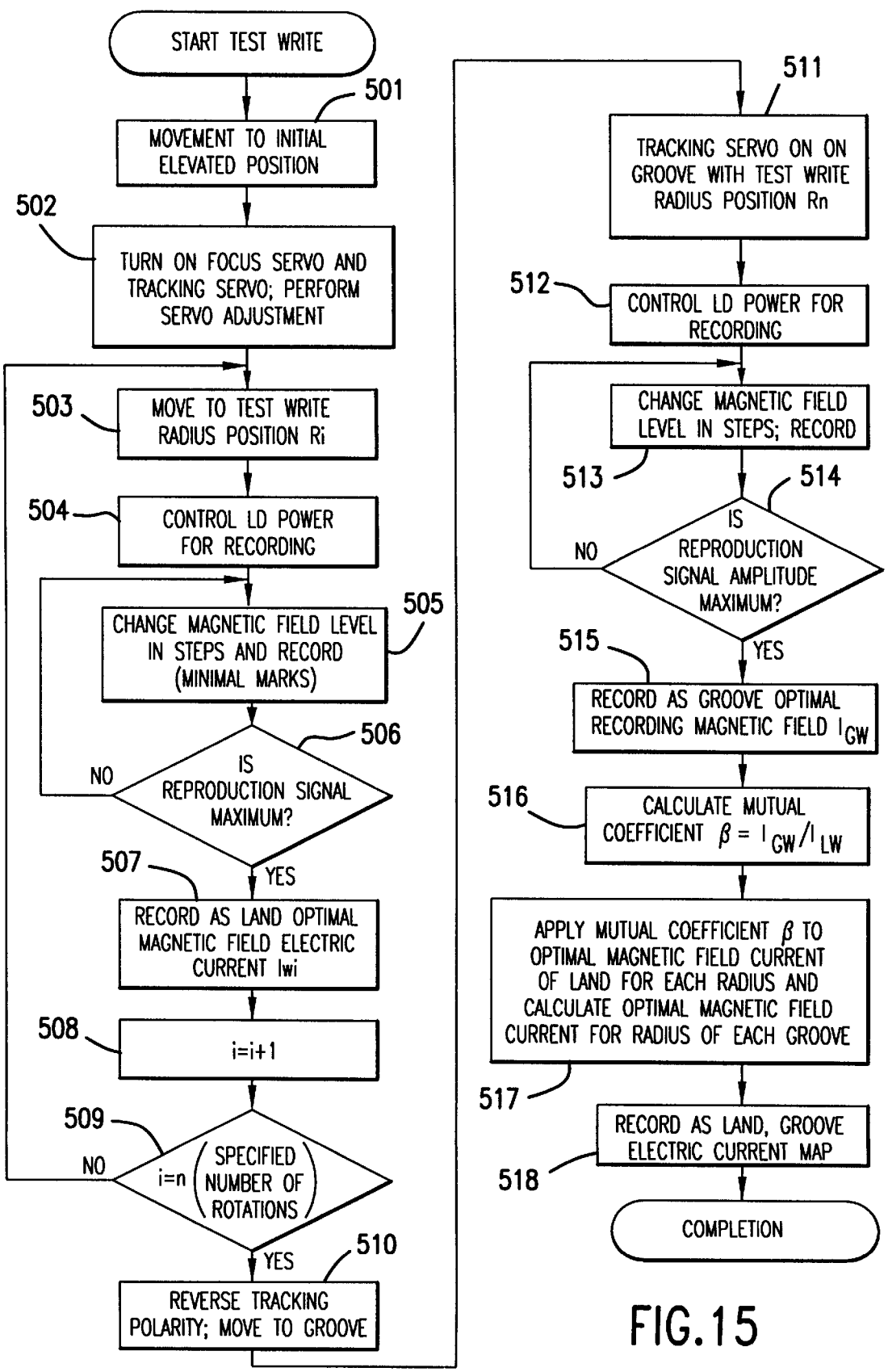
FIG. 15 is a flow chart showing the test writing operation in the information recording and reproduction device according to the second embodiment of the present invention.
Figure 16:
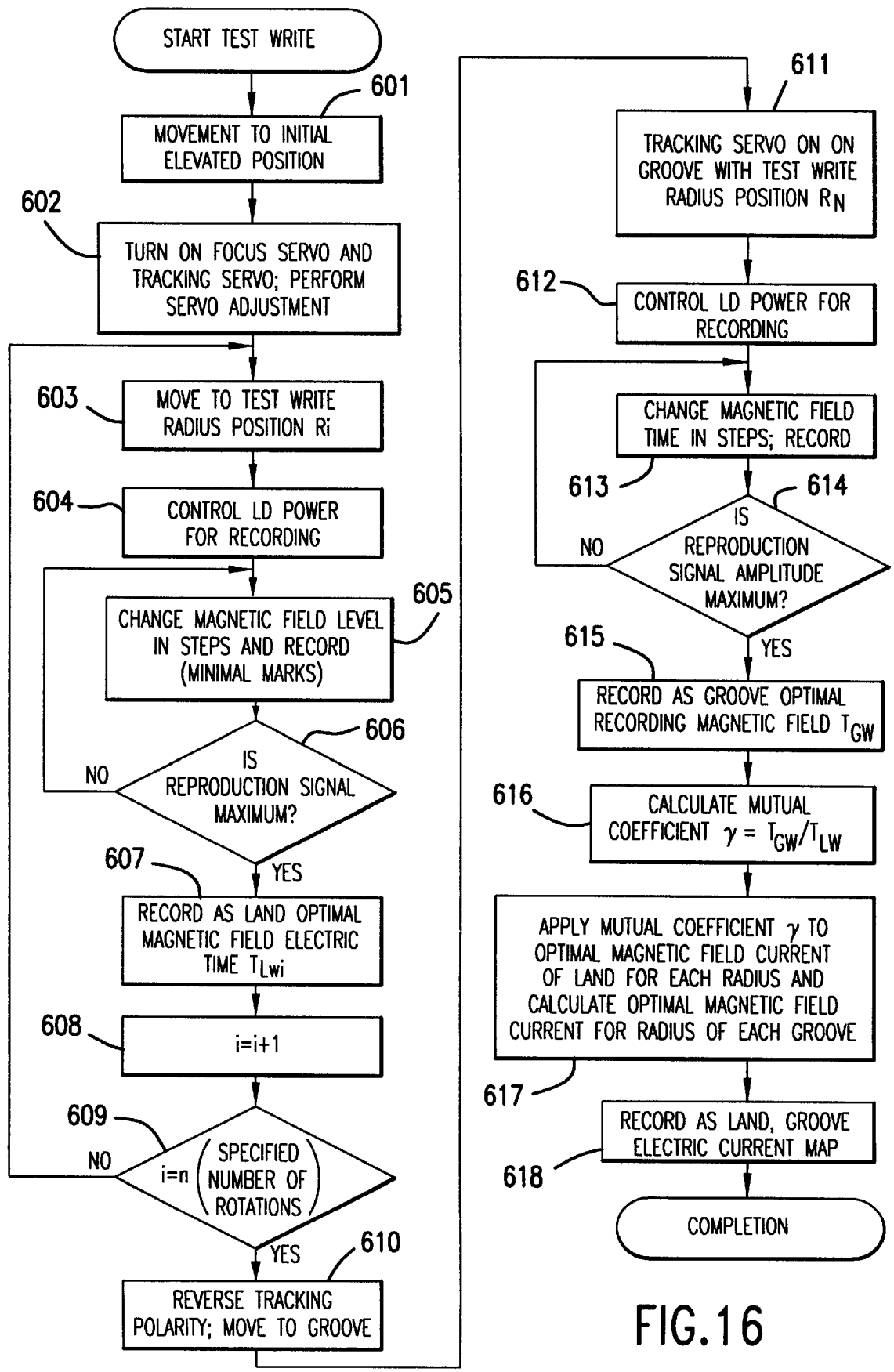
FIG. 16 is a flow chart showing the test writing operation in the information recording and reproduction device according to the second embodiment of the present invention.

An explanation is provided hereafter with regard to the test write operation, with reference to FIGS. 15 and 16.

After the recording medium 1 is mounted in the information recording and reproduction device, and after the recording medium 1 reaches a specified number of rotations, the head 2 is moved to the initial servo elevated position in Step 501, by means of the specified seek control system (not shown in the diagram). Next, the light spot of the light beam 25 is added to the specified land track, and specified servo adjustment is accomplished in Step 502.

With this servo adjustment, for example focus servo loop gain adjustment and offset adjustment, or tracking servo loop gain adjustment and offset adjustment is accomplished by means of gain establishment circuits 5 and 8.

Following the servo adjustment, the specified tracking loop of the recording medium 1 accomplishes in Steps 503 through 508 the write operation in for example the land track (first track group). At this time, the test writing is accomplished in a region which has two or more points in the radial direction of the medium. In this instance, this is accomplished in a region having radial positions (R1-Rm).

First, following the determination of the current track position, though the accomplishment of the reproduction of the address information (formatted ID data) of the sector which is pre-recorded in the recording medium 1, the head 2 is moved in Step 503 by a seek control system until it reaches the specified test write region.

In this instance, through the parallel accomplishment of focus control and tracking control, the light beam 25 is applied to the specified land 1a, the address information is retrieved in the manner described, and confirmation is made that the present track is the land 1a at the radial position R1.

Subsequently, the LD recording power is established in Step 504 relative to the specified track, in this instance land 1a.

Next, as shown in FIG. 13, switching is accomplished in steps of the electric current level Iw1, and Ie1 flowing to the magnetic field control device 3, and the minimum mark is continuously written in Step 505.

In the case where the written-in mark is retrieved, changing the recording power in this manner, the reproduction signal level and the reproduction signal amplitude level is changed.

When a mark such as that shown in FIG. 13 is generally the optimally recorded mark, the reproduction signal amplitude of the mark recorded with excess power becomes smaller, and the level of the average value becomes larger. In addition, the reproduction signal amplitude of the mark recorded with small power becomes smaller, and the average value level also becomes smaller.

Furthermore, in the case where estimating the optimal recording power, the amplitude of the reproduction signal is monitored, and selection is accomplished in Step 506 of the electric current level for which the reproduction signal amplitude becomes maximized. Also, the optimal current level is recorded to EP-ROM 14 as the optimal electric current level of the land track at the radial position R1 in Step 507.

Furthermore, observation might well be made of the amplitude of the reproduction power for each switching of the electric current level, one by one, and it would also be acceptable for the detection of the amplitude maximum to be accomplished with compilation following the initial writing in with the continuously switched electric current pulse.

Through the repetitive accomplishment in Steps 508 and 509 of test writing relating to the radius positions R1-Rm, the optimal power is obtained of the land track at each radial position R1-Rm.

Next, by changing the land/groove information toward the polarity reversal circuit 10, the tracking polarity is reversed, and moved toward the groove track, becoming the applied state in Steps 510 and 511, and thereafter the optimal recording power is obtained for the groove track.

The groove track that accomplishes the test writing selects only one point from among the radial positions R1-Rm. Furthermore, if the radial position of the final test writing of the land track is selected (radius Rm), the movement control of the head 2 can be curtailed, and the processing time can be shortened.

In this instance, recording is accomplished in Step 513, changing the current level in steps at only the radius Rm, and detection is accomplished in Step 514 of the amplitude maximum of the reproduction signal in the same manner as for the land track. Recording is accomplished in Step 515 of the electric current value as the optimal electric current level of the groove track with the radius Rm.

At this time, it does not matter if switching is accomplished or is not accomplished of the magnetic field polarity between the land and the groove. Calculation of the ratio when switching is accomplished by scalar processing.

Next, the proportional coefficient b of the optimal electric current level of the land and the groove track with the same radius Rm is calculated in Step 516 by means of the following formula, where the power of the land track and group track is represented as Ilw and Igw:

$$b = Igw/Ilw$$

If utilization is made of this coefficient, then creation can be accomplished of the map which shows the optimal recording power for each diameter of the groove track.

First, the map of the optimal electric current level for each continuous radius creates information obtained by the test writing of the land track for the accomplishment of interpolation. Creation is accomplished in Step 517 of the optimal electric current level map of the groove track applying the proportional coefficient to the optimal electric current level of the corresponding land track.

The electric current level map of the land and groove tracks for each radius obtained in this manner is recorded in Step 518 in EP-ROM 14, and the electric current level of the actual magnetic field control device 3 in the following operations are controlled on the basis of this map.

In addition, notwithstanding the change in the magnetic field level, with this embodiment, substitution was accomplished in stages in Step 505 of the electric current level flowing to the magnetic field control device 3, but the electric field level may be changed through changing the time of the flow of electric current. FIG. 16 is a flow chart which shows the operation of test writing, changing the time width of the flow of electric current to the magnetic field control device 3.

In FIG. 16, the steps extending from Step 601 to Step 604 are the same as steps extending from Step 501 to Step 504 in FIG. 15.

Next, the flow time tw1, te1 (See FIG. 13) for the flow of current to the magnetic field control device 3 is switched in steps, and minimal marks are continuously written in Step 605.

Also, the amplitude of the reproduction signal of the written-in mark is monitored, and selection is accomplished in Step 606 of the time width of the electric current where the reproduction signal amplitude is maximum. Also, the amplitude of the time of the optimal electric current is recorded in Step 607 to the EP-ROM 14 as the optimal recording magnetic field electric current width of the land track with the radius R1.

Also, by the repetitive execution in Step 608 and Step 609 of processing relating to the radial positions R1-Rm, the optimal power is obtained of the land track of each radial position R1-Rm.

Next, in the same manner as with FIG. 15, the light spot is moved toward the groove track, and the optimal recording power with the groove track is obtained.

The operations of Steps 610, 611 and 612 are the same as for Steps 510–512 of FIG. 15.

In Step 613, recording is accomplished, changing the time width of the electric current which flows in stages. In Step 614, detection is accomplished of the time in which the amplitude of the reproduction signal is maximum, and in Step 615, recording is accomplished of its electric current width as the optimal electric current width of the groove track in its radius.

In Step 616, the optimal electric current width of the land track and groove track with the same radius Rm is calculated by means of the formula below for the proportional coefficient g of the power of the land track and groove track, as the respective TLW and TGW:

$$g = TGW/TLW$$

If utilization is made of this coefficient, creation can be accomplished of a map which shows the optimal recording power for each radius of the groove track.

The map of the optimal electric current for each continuous radius is created through the accomplishment of interpolation based on the information obtained with the test writing with the land track. The map of the optimal electric current width of the groove track is created in Step 617 applying the proportional coefficient to the optimal electric current width of the land track.

The map of the electric current width of the land and groove track for each radius obtained in this manner is recorded in Step 618 in EP-ROM 14, and control is accomplished of the electric current width of the actual magnetic field control device and the following operations, on the basis of this map.

As explained above, accurate recording and reproduction can be accomplished even relative to either a land track/groove track which have different recording sensitivities.

In addition, the present invention is such that calculation is accomplished of recording, erasure, and reproduction conditions relative to the information track of each radial position of the information track group on the basis of recording, erasure, and reproduction conditions relating to multiple information tracks having different radial positions, which belong to the same information track group.

In addition, the selection process of recording, erasure, and reproduction conditions in each information track can be abbreviated by means of test writing, by which, selection is possible of quick, appropriate recording, erasure and reproduction conditions.

While this invention has been described in conjunction with specific embodiments thereof, it is evident that many alternatives, modifications and variations will be apparent to those skilled in the art. Accordingly, the preferred embodiments of the invention as set forth herein are intended to be illustrative, not limiting. Various changes may be made without departing from the spirit and scope of the invention as defined in the following claims.

What is claimed is:

1. An information recording and reproduction device that records, erases or reproduces information by projecting a laser beam to a recording medium that has a first group of information tracks and a second group of information tracks, both of which are in a concentric or spiral state, there being a difference in a height of the information tracks of the first group relative to the second group, the tracks of the first group alternating with the tracks of the second group in a radial direction of the recording medium, comprising:

recording means for accomplishing multiple recording of specific information at different recording conditions to a selected one of the information tracks;

reproduction means for reproducing the specific information from the selected one of the information tracks;

condition determination means for determining the recording conditions, erasure conditions, or reproduction conditions for the information tracks of the first group and for the information tracks of the second group based on a plurality of reproduction signals reproduced by the reproduction means; and control means for controlling the recording, erasure or reproduction of information in the selected information track based on conditions determined by the condition determination means; wherein said control means:

selects the recording condition, erasure condition, or reproduction condition for the multiple information tracks located at the same radial position and belonging to each of the first and second information track groups, by means of test writing, and on the basis of a proportional coefficient between both information track groups obtained from the selected recording conditions, erasure conditions or reproduction conditions, and calculates recording conditions, erasure conditions or reproduction conditions for the information tracks of the second information track group from the recording conditions, erasure conditions or reproduction conditions determined for the information tracks of the first information track group.

2. The device of claim 1, wherein the recording condition includes a wave height value and a pulse width of a recorded pulse.

3. The device of claim 1, wherein the reproduction conditions include a reproduction power level and a frequency of the high frequency accumulation.

4. The device of claim 1, wherein the erasure condition includes an erasure power level.

5. The device of claim 1, further comprising a magnetic field control means for controlling a strength of an external magnetic field applied to the recording medium at the time of recording or erasure; the magnetic field control means, by controlling at least one of the strength of the magnetic field, the polarity of the magnetic field, or the period of generation of the magnetic field, applies an external magnetic field that differs corresponding to the recording sensitivity of the recording medium.

6. An information recording and reproduction device that records, erases or reproduces information by projecting a laser beam to a recording medium that has a first group of information tracks and a second group of information tracks, both of which are in a concentric or spiral state, there being a difference in a height of the information tracks of the first group relative to the second group, the tracks of the first group alternating with the tracks of the second group in a radial direction of the recording medium, comprising:

a recording device that records specific information multiple times at different recording conditions on a selected one of the information tracks;

a reproduction device that reproduces the specific information from the selected one of the information tracks; and a controller tat determines the recording conditions, erasure conditions, or reproduction conditions to be used for the information tracks of the first group and for the information tracks of the second group based on a plurality of reproduction signals reproduced by the reproduction device, wherein the controller:

controls the recording, erasure or reproduction of information in the selected information track based on conditions determined by the controller, selects the recording condition, erasure condition, or reproduction condition for the multiple information tracks located at the same radial position and belonging to each of the first and second information track groups, by means of test writing, and on the basis of a proportional coefficient between both information track groups obtained from the selected recording conditions, erasure conditions or reproduction conditions, and calculates recording conditions, erasure conditions or reproduction conditions for the information tracks of the second information track group from the recording conditions, erasure conditions or reproduction conditions determined for the information tracks of the first information track group.

7. The device of claim 6, wherein the recording condition includes a wave height value and a pulse width of a recorded pulse.

8. The device of claim 6, wherein the reproduction conditions include a reproduction power level and a frequency of the high frequency accumulation.

9. The device of claim 6, wherein the erasure condition includes an erasure power level.

10. The device of claim 6, further comprising a magnetic field controller that controls a strength of an external, magnetic field applied to the recording medium at the time of recording or erasure; the magnetic field controller, by controlling at least one of the strength of the magnetic field, the polarity of the magnetic field, or the period of generation of the magnetic field, applies an external magnetic field that differs corresponding to the recording sensitivity of the recording medium.

11. A method of determining a recording condition, erasure conditions, or reproduction conditions in an information recording and reproduction device that records, erases or reproduces information by projecting a laser beam to a recording medium that has a first group of information tracks and a second group of information tracks, both of which are in a concentric or spiral state, there being a difference in a height of the information tracks of the first group relative to the second group, the tracks of the first group alternating with the tracks of the second group in a radial direction of the recording medium, comprising the steps of:

recording specific information multiple times at different recording conditions to a selected one of the information tracks;

reproducing the specific information from the selected one of the information tracks; and determining the recording conditions, erasure conditions or reproduction conditions for the information tracks of the first group and for the information tracks of the second group based on a plurality of reproduction signals reproduced during the reproduction step by:

determining the recording conditions, erasure conditions or reproduction conditions for the plurality of information tracks located at different radial positions of the recording medium for the first group, and determining the recording conditions, erasure conditions or reproduction conditions for the information tracks at each of the radial positions for the second group based on the recording conditions, erasure conditions, or reproduction conditions that were determined for the first group;

wherein the recording conditions, erasure conditions or reproduction conditions for the information tracks at each of the radial positions for the second group are determined based on the recording conditions, erasure conditions, or reproduction conditions that were determined for the first group and on a proportional coefficient between both information track groups obtained from the selected recording conditions, erasure conditions or reproduction conditions.

12. The method of claim 11, wherein the recording condition includes a wave height value and a pulse width of a recorded pulse.

13. The method of claim 11, wherein the reproduction conditions include a reproduction power level and a frequency of the high frequency accumulation.

14. The method of claim 11, wherein the erasure condition includes an erasure power level.

* * * * *